(12) United States Patent
Matsui et al.

(10) Patent No.: US 10,089,584 B2
(45) Date of Patent: Oct. 2, 2018

(54) SEAT MANAGEMENT SYSTEM, CONTROL METHOD FOR SEAT MANAGEMENT SYSTEM, AND PROGRAM

(71) Applicant: Rakuten, Inc., Tokyo (JP)

(72) Inventors: Kenta Matsui, Tokyo (JP); Misato Takahashi, Tokyo (JP); Moriyoshi Koizumi, Tokyo (JP); Shin Aoyama, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 15/810,128

(22) Filed: Nov. 12, 2017

(65) Prior Publication Data

US 2018/0068237 A1  Mar. 8, 2018

Related U.S. Application Data

(63) Continuation-in-part of application No. 14/187,345, filed on Feb. 24, 2014.

(30) Foreign Application Priority Data

Dec. 25, 2012 (JP) ................................ 2012-281851

(51) Int. Cl.
*G06Q 10/02* (2012.01)
*G06Q 50/00* (2012.01)

(52) U.S. Cl.
CPC ........... *G06Q 10/02* (2013.01); *G06Q 10/025* (2013.01); *H05K 999/99* (2013.01)

(58) Field of Classification Search
CPC ............................ G06Q 10/02; G06Q 10/025
See application file for complete search history.

(56) References Cited

U.S. PATENT DOCUMENTS

| 2008/0077505 A1* | 3/2008 | Ilechko | G06Q 10/02 705/5 |
| 2013/0054279 A1* | 2/2013 | Sharp | G06Q 10/02 705/5 |
| 2013/0117052 A1* | 5/2013 | Wyler | G06Q 10/02 705/5 |
| 2013/0275162 A1* | 10/2013 | Champlin | G06Q 10/02 705/5 |

* cited by examiner

Primary Examiner — Christopher L Gilligan
(74) Attorney, Agent, or Firm — HEA Law PLLC

(57) ABSTRACT

A related user identifying unit identifies a related user who has a given relation to an assigned user to whom at least one seat has been allocated. A restriction target selecting unit selects, as a restriction target, a seat or a group of seats that is adjacent to the seat allocated to the assigned user and that is not allocated to any user. An allocation restricting unit restricts the allocation of the seat or group of seats selected as the restriction target to any user other than related users for a given restriction period. A second allocation unit allocates, in a case where the request is received from the related user, the seat selected as the restriction target, or at least one seat out of the group of seats selected as the restriction target, to the related user.

3 Claims, 13 Drawing Sheets

FIG.7

| USER ID | PASSWORD | NAME | E-MAIL ADDRESS | FRIENDS |
|---|---|---|---|---|
| SU1 | --- | --- | --- | SU2, SU10 |
| SU2 | --- | --- | --- | SU1, SU5 |
| ... | ... | ... | ... | ... |

FIG.8

| USER ID | PASSWORD | NAME | E-MAIL ADDRESS | CREDIT CARD INFORMATION | SNS USER ID |
|---|---|---|---|---|---|
| U1 | --- | --- | --- | --- | SU1 |
| U2 | --- | --- | --- | --- | SU2 |
| U3 | --- | --- | --- | --- | SU3 |
| ... | ... | ... | ... | ... | ... |

FIG.9

| EVENT ID | EVENT NAME | CATEGORY | DATE/TIME | EVENT SITE | PRICE |
|---|---|---|---|---|---|
| E1 | ○○○○○○ | MUSIC | 2012/5/26 19:00 | △△△HALL | --- |
| E2 | ○○ VS □□ | SPORTS | 2012/6/2 14:00 | △△STADIUM | --- |
| ... | ... | ... | ... | ... | ... |

FIG.10

| EVENT ID | SEAT | BLOCK | STATUS | UPDATED DATE/TIME | RESERVED BY | TICKET ID | ASSOCIATED SEAT |
|---|---|---|---|---|---|---|---|
| E1 | A1 | L | 0 | | | | |
| | A2 | L | 0 | | | | |
| | A3 | C | 1 | 2012/5/2 16:00 | U5 | 245631098 | |
| | A4 | C | 1 | 2012/5/1 22:00 | U20 | 876543201 | |
| | A5 | C | 0 | | | | |
| | A6 | C | 0 | | | | |
| | A7 | C | 0 | | | | |
| | A8 | C | 2 | 2012/5/2 19:00 | | | A9 |
| | A9 | C | 1 | 2012/5/2 19:00 | U1 | 456738912 | |
| | A10 | R | 0 | | | | |
| | A11 | R | 0 | | | | |
| | ... | ... | ... | ... | ... | ... | ... |
| ... | ... | ... | ... | ... | ... | ... | ... |

FIG.11

| USER ID | EVENT ID | SEAT | PRICE | PURCHASE DATE/TIME |
|---|---|---|---|---|
| U20 | E1 | A4 | 5000 | 2012/5/1 22:00 |
| U5 | E1 | A3 | 5000 | 2012/5/2 16:00 |
| U1 | E1 | A9 | 5000 | 2012/5/2 19:00 |
| ... | ... | ... | ... | ... |

FIG.15A

| EVENT ID | SEAT | BLOCK | STATUS | UPDATED DATE/TIME | RESERVED BY | TICKET ID | ASSOCIATED SEAT |
|---|---|---|---|---|---|---|---|
| E1 | A8 | C | 0 | | | | |
| | A9 | C | 0 | | | | |

FIG.15B

| EVENT ID | SEAT | BLOCK | STATUS | UPDATED DATE/TIME | RESERVED BY | TICKET ID | ASSOCIATED SEAT |
|---|---|---|---|---|---|---|---|
| E1 | A8 | C | 0 | | | | |
| | A9 | C | 1 | 2012/5/2 19:00 | U1 | 456738912 | |

FIG.15C

| EVENT ID | SEAT | BLOCK | STATUS | UPDATED DATE/TIME | RESERVED BY | TICKET ID | ASSOCIATED SEAT |
|---|---|---|---|---|---|---|---|
| E1 | A8 | C | 2 | 2012/5/2 19:00 | | | A9 |
| | A9 | C | 1 | 2012/5/2 19:00 | U1 | 456738912 | |

FIG.15D

| EVENT ID | SEAT | BLOCK | STATUS | UPDATED DATE/TIME | RESERVED BY | TICKET ID | ASSOCIATED SEAT |
|---|---|---|---|---|---|---|---|
| E1 | A8 | C | 1 | 2012/5/3 22:00 | U2 | 678345219 | A9 |
| | A9 | C | 1 | 2012/5/2 19:00 | U1 | 456738912 | |

FIG.16

COMPLETION SCREEN

| EVENT NAME | ○○○○○○ |
|---|---|
| DATE/TIME | 19:00 SATURDAY, MAY 26, 2012 |
| LOCATION | △△△HALL |
| SEAT | A9 |
| PRICE | 5,000 YEN |

[DISPLAY] 52    [PRINT] 54

NEXT SEAT, A8, IS SECURED FOR
YOUR COMPANY UNTIL 19:00, MAY 5. ←56
WHY DON'T YOU INVITE YOUR FRIEND?

CHECK THE NAME
OF THE PERSON TO BE INVITED TO GO WITH YOU
☐ ○○○○
☐ △△△△    ←90
☐ ××××

[INVITE] 92

50A

SEAT MANAGEMENT SYSTEM, CONTROL METHOD FOR SEAT MANAGEMENT SYSTEM, AND PROGRAM

CROSS REFERENCE TO RELATED APPLICATIONS

This application claims priority to and is a continuation in part of U.S. application Ser. No. 14/187,345 filed on Feb. 24, 2014, which claims priority based on Japanese Patent Application No. 2012-281851 filed on Dec. 25, 2012. The contents of each of the above documents are incorporated herein by reference in their entirety.

TECHNICAL FIELD

The present invention relates to a seat management system, a control method for a seat management system, and a program.

BACKGROUND ART

A user who is planning to go to a concert or a sport game is often of the mind to bring along friends or the like, and would want to secure adjacent seats for himself/herself and his/her company. Sometimes, however, whether or not there is going to be someone who accompanies the user or which friend is going to accompany the user is uncertain at the time the user reserves seats, that is, books tickets. In such cases in the past, the user would purchase tickets for himself/herself and his/her company both after it became certain who would accompany him/her, or the user would purchase tickets for himself/herself and his/her company first and then look for someone to go with.

CITATION LIST

Patent Literature

Patent Literature 1: JP 2005-84867 A

SUMMARY OF INVENTION

Technical Problem

In the case where the user purchases tickets for himself/herself and his/her company both after knowing definitely who is going to accompany him/her, if it takes long to determine who is going to accompany him/her, the user may miss the chance to book tickets before the event's tickets are sold out. In the case where the user purchases tickets for himself/herself and his/her company first and then looks for someone to go with, the tickets for possible company may be wasted if the user is not successful at finding someone who can go with him/her. In addition, the user himself/herself needs to purchase tickets in both cases, which burdens the user with bothersome procedures and a rather large cost.

A system is known to allow a user to make a tentative reservation for seats before the user purchase the seats. However, those events need to be held on a fixed date regardless of how well the tickets are selling, and allowing the user to keep the tentative reservation status longer than necessary is not beneficial to the promoter of the event. Tentative reservation also does not lessen user's burden because the user still need to make the reservation himself/herself.

The same situation is found when one reserves seats on airplanes, trains, or the like, not just with the booking of tickets for concerts and sport games.

The present invention has been made in view of the problems described above, and an object of the present invention is to provide a seat management system, a control method for a seat management system, and a program with which a user who does not have definite company for a future event only needs to secure a seat for himself/herself in order to secure a seat adjacent to the user's seat for his/her company when it subsequently becomes certain that someone is going to accompany the user, and the procedure for booking seats is simplified as well.

Solution to Problem

In order to solve the above-mentioned problems, a seat management system according to one embodiment of the present invention is a seat management system for managing seats at an event site, including: receiving means for receiving a request for a seat reservation from a user; first allocation means for allocating at least one seat to the user in a case where the request is received from the user; related user identifying means for identifying a user (hereinafter referred to as "related user") who has a given relation to the user (hereinafter referred to as "assigned user") to whom at least one seat has been allocated, based on what is stored in relation data storing means which stores relation data indicating a relation between users; restriction target selecting means for selecting, as a restriction target, one of a seat and a group of seats that is adjacent to the seat allocated to the assigned user and that has not been allocated to any user, based on adjacent status data which indicates an adjacent status between seats, and allocation status data which indicates whether or not a seat is allocated to any user; allocation restricting means for restricting allocation of the one of the seat and the group of seats that has been selected as the restriction target to any user other than the related user for a given restriction period; and second allocation means for allocating one of the seat selected as the restriction target and at least one seat out of the group of seats selected as the restriction target to the related user in a case where the request is received from the related user. The seat management system is also configured to vary a length of the given restriction period based on a number of seats that are not allocated to any user.

Thus, due to reduction or elimination of wasteful or meaningless accesses of the server, the amount of reception processing is reduced, and as a result thereof, the reception processing load on servers is reduced along with an attendant decrease in Internet traffic.

Further, a control method for a seat management system according to one embodiment of the present invention is a control method for a seat management system for managing seats at an event site, the control method including: a receiving step of receiving a request for a seat reservation from a user; a first allocation step of allocating at least one seat to the user in a case where the request is received from the user; a related user identifying step of identifying a user (hereinafter referred to as "related user") who has a given relation to the user (hereinafter referred to as "assigned user") to whom at least one seat has been allocated, based on what is stored in relation data storing means which stores relation data indicating a relation between users; a restriction target selecting step of selecting, as a restriction target, one of a seat and a group of seats that is adjacent to the seat allocated to the assigned user and that has not been allocated to any user, based on adjacent status data which indicates an adjacent status between seats, and allocation status data which indicates whether or not a seat is allocated to any user; an allocation restricting step of restricting allocation of the one of the seat and the group of seats that has been selected as the restriction target to any user other than the related user for a given restriction period; and a second allocation step of allocating one of the seat selected as the restriction target and at least one seat out of the group of seats selected as the restriction target to the related user in a case where the request is received from the related user. The control method is also configured to vary a length of the given restriction period based on a number of seats that are not allocated to any user.

Thus, due to reduction or elimination of wasteful or meaningless accesses of the server, the amount of reception processing is reduced, and as a result thereof, the reception processing load on servers is reduced along with an attendant decrease in Internet traffic.

Further, a program according to one embodiment of the present invention is a program for causing a computer to function as: receiving means for receiving a request for a seat reservation from a user; first allocation means for allocating at least one seat to the user in a case where the request is received from the user; related user identifying means for identifying a user (hereinafter referred to as "related user") who has a given relation to the user (hereinafter referred to as "assigned user") to whom at least one seat has been allocated, based on what is stored in relation data storing means which stores relation data indicating a relation between users; restriction target selecting means for selecting, as a restriction target, one of a seat and a group of seats that is adjacent to the seat allocated to the assigned user and that has not been allocated to any user, based on adjacent status data which indicates an adjacent status between seats, and allocation status data which indicates whether or not a seat is allocated to any user; allocation restricting means for restricting allocation of the one of the seat and the group of seats that has been selected as the restriction target to any user other than the related user for a given restriction period; and second allocation means for allocating one of the seat selected as the restriction target and at least one seat out of the group of seats selected as the restriction target to the related user in a case where the request is received from the related user. Further, the program causes a computer to function as varying a length of the given restriction period based on a number of seats that are not allocated to any user.

Thus, due to reduction or elimination of wasteful or meaningless accesses of the server, the amount of reception processing is reduced, and as a result thereof, the reception processing load on servers is reduced along with an attendant decrease in Internet traffic.

Further, a computer-readable information recording medium according to one embodiment of the present invention is a computer-readable information recording medium having the above-mentioned program recorded thereon.

Thus, due to reduction or elimination of wasteful or meaningless accesses of the server, the amount of reception processing is reduced, and as a result thereof, the reception processing load on servers is reduced along with an attendant decrease in Internet traffic.

Further, in one embodiment of the present invention, the seat management system may further include: invitee candidate selecting means for selecting the related user as an invitee candidate; invites candidate presenting means for presenting the related user who has been selected as the invitee candidate to the assigned user; and inviting means for inviting, in a case where the related user who has been presented to the assigned user is specified by the assigned user as an invitee, the related user who is specified as the invitee to make the request.

Further, in one embodiment of the present invention, the invitee candidate selecting means may select the related user as the invitee candidate based on what is stored in history data storing means which stores history data indicating a request history of the user.

Further, in one embodiment of the present invention, the seat management system may further include: invitee selecting means for selecting the related user as an invitee; and inviting means for inviting the related user who is selected as the invitee to make the request.

Further, in one embodiment of the present invention, the invitee selecting means may select the related user as the invitee based on what is stored in history data storing means which stores history data indicating a request history of the user.

Further, in one embodiment of the present invention, the receiving means may include means for receiving specification of at least one desired seat from the user, and the seat management system may further include: means for inquiring the assigned user about whether or not the assigned user intends to make the request for the one of the seat selected as the restriction target and at least one seat out of the group of seats selected as the restriction target, in a case where the one of the seat selected as the restriction target and at least one seat out of the group of seats selected as the restriction target is specified as the desired seat by a user other than the related user; means for allocating the one of the seat selected as the restriction target and at least one seat out of the group of seats selected as the restriction target to the assigned user, in a case where the assigned user chooses to make the request for the one of the seat selected as the restriction target and at least one seat out of the group of seats selected as the restriction target; and means for allocating the one of the seat selected as the restriction target and at least one seat out of the group of seats selected as the restriction target to the user other than the related user, in a case where the assigned user does not choose to make the request for the one of the seat selected as the restriction target and at least one seat out of the group of seats selected as the restriction target.

Further, in one embodiment of the present invention, the receiving means may include means for receiving specification of at least one desired seat from the user, and the seat management system may further include: means for presenting the one of the seat selected as the restriction target and at least one seat out of the group of seats selected as the restriction target to the related user, in a case where the request is received from the related user; and means for allocating, in a case where the seat presented to the related user is specified as the desired seat by the related user, the seat specified as the desired seat to the related user.

Further, in one embodiment of the present invention, the seat management system may further include means for lifting the restriction imposed by the allocation restricting means in a case where the restriction period expires.

Further, in one embodiment of the present invention, the seat management system may further include means for canceling the allocation of the seat to the assigned user based on a request of the assigned user, in a case where the request is not received from the related user before the restriction period expires.

Further, in one embodiment of the present invention, the seat management system may further include means for varying a length of the restriction period based on at least one of a number of seats that are not allocated to any user or one of a remaining number of days and a remaining time till an event is held.

According to one embodiment of the present invention, a user who does not have definite company for a future event only needs to secure a seat for himself/herself in order to secure at least one seat adjacent to the user's seat for his/her company when it subsequently becomes certain someone is going to accompany the user. The present invention, where the user himself/herself does not secure the seat for his/her company, also provides an option of allowing the system to make a direct booking transaction with the user's company, and thus facilitates the procedure for booking seats.

One objective of the present system is to allow a temporary reservation for a seat before a group is determined. However, during a period for this temporary reservation (e.g., a restriction period), a reservation for a temporarily reserved seat by someone other than those who made the temporary reservation is restricted. When the restriction period is fixed, a technical problem arises such as when the system is flooded by users accessing the system for seat reservations (e.g., the situation where the quantity of available seats is small, but an event is popular). Until reservations for the temporarily reserved seats are confirmed, a large number of "meaningless" user accesses can occur (e.g., applications for reservations from someone other than those who made the temporary reservations, which increases web traffic, increases system load, and reduces efficiency of the system).

By varying the length of the restriction period based on the number of remaining seats (e.g., setting the restriction period to be short when the number of remaining seats is small), the meaningless accesses (unnecessary traffic) can be reduced, thereby reducing web traffic, reducing system load, and increasing efficiency of the system. On the other hand, in a situation where an access for a seat reservation seldom occurs (e.g., when the quantity of remaining seats is large), the restriction period for the temporary reservations can be set to a longer period of time. As noted above, while making it possible to confirm reservations for more seats, the accesses for confirming the reservations for those seats can also be reduced, thereby reducing web traffic, reducing system load, and increasing efficiency of the system.

Further, according to the present system, the restriction period can be dynamically adjusted based on the number of remaining seats, in consideration of both the desire of the sponsor side to reduce the number of remaining seats as early as possible and the desire of the user side to secure a temporary reservation as long as possible.

Thus, the present system improves conventional seat reservation systems and makes them more dynamic and efficient by reducing web traffic and system loads (specific to the realm of Internet technology.)

BRIEF DESCRIPTION OF DRAWINGS

FIG. 7 is a diagram showing an example of a user table in a social networking service.

FIG. 8 is a diagram showing an example of a user table in a ticket booking service.

FIG. 9 is a diagram showing an example of an event table.

FIG. 10 is a diagram showing an example of a seat table.

FIG. 11 is a diagram showing an example of a history table.

FIG. 15A is a diagram explaining the processing executed in the seat management system.

FIG. 15B is a diagram explaining the processing executed in the seat management system.

FIG. 15C is a diagram explaining the processing executed in the seat management system.

FIG. 15D is a diagram explaining the processing executed by the seat management system.

FIG. 16 is a diagram illustrating another example of the completion screen.

DESCRIPTION OF EMBODIMENTS

Now, an example of an embodiment of the present invention is described in detail referring to the accompanying drawings.

Figure 1:
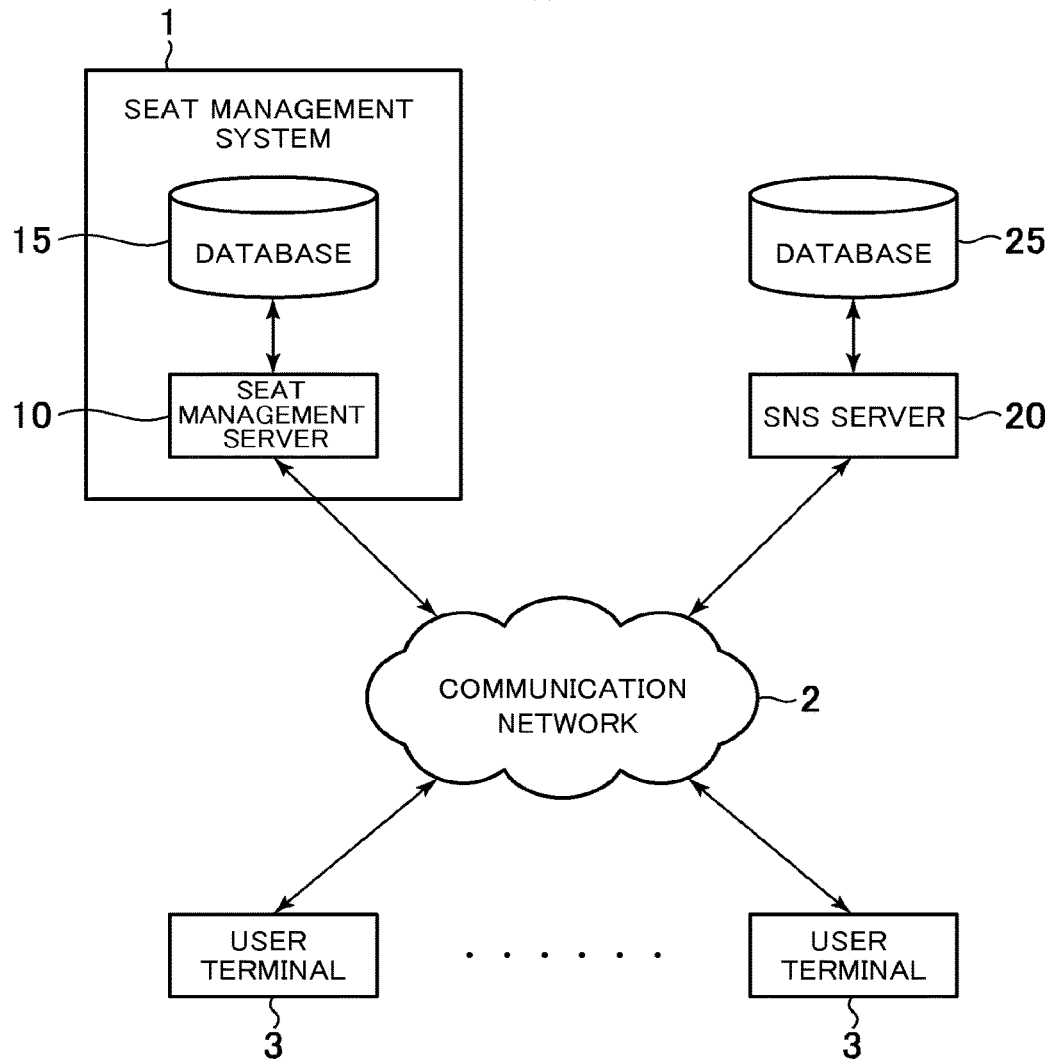
FIG. 1 is a diagram illustrating an example of the overall configuration of a seat management system according to an embodiment of the present invention.

FIG. 1 illustrates an example of the overall configuration of a seat management system according to the embodiment of the present invention. The seat management system 1 of FIG. 1 is a system for managing seats at an event such as a concert or a sport event, and provides a ticket booking service for the event. As illustrated in FIG. 1, the seat management system 1 includes a seat management server 10 and a database 15.

This system 1 design results in the reduction or elimination of wasteful or meaningless accesses of the server, the reduction of reception processing. As a result thereof, the reception processing load on server 10 is reduced along with an attendant decrease in Internet traffic.

Figure 2:
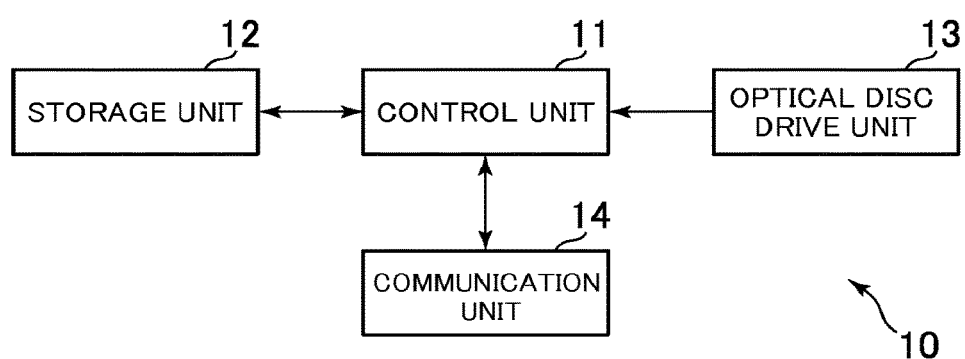
FIG. 2 is a diagram illustrating an example of the hardware configuration of a seat management server.

The seat management server 10 allocates a seat to a user who wishes to reserve a seat at an event, and issues an electronic ticket or a paper ticket to the user. FIG. 2 illustrates an example of the hardware configuration of the seat management server 10. As illustrated in FIG. 2, the seat management server 10 includes a control unit 11, a storage unit 12, an optical disc drive unit 13, and a communication unit 14.

The control unit 11 includes, for example, at least one microprocessor and executes processing according to an operating system or program stored in the storage unit 12. The storage unit 12 includes a main memory and auxiliary storage. For example, the main memory is a RAM and the auxiliary storage is a hard disk, a solid state drive, or the like.

The optical disc drive unit 13 reads a program or data recorded on an optical disc (information storage medium). The program or data is supplied to the storage unit 12 via the optical disc. Programs and data may be supplied to the storage unit 12 via other information storage media than an optical disc.

The communication unit 14 is used for data communication via a communication network 2. Programs and data may be supplied to the storage unit 12 via the communication network 2.

The seat management server 10 can access the database 15. The database 15 may be built on a server computer separate from the seat management server 10, or may be built on the seat management server 10. The database 15 stores data necessary to provide a ticket booking service. Details thereof are described later (see FIGS. 8 to 11).

The seat management system 1 can perform data communication to/from a social networking service (SNS) server 20 via the communication network 2.

The SNS server 20 provides a social networking service. A social networking service is a communication service which allows users to socialize with one another, and Twitter (trademark) and Facebook (trademark) can be given as examples. The social networking service may be provided by a corporation that is not the one providing the ticket booking service, or may be provided by the same corporation. The SNS server 20 has the same hardware configuration as that of the seat management server 10.

The SNS server 20 can access a database 25. The database 25 may be built on a server computer separate from the SNS server 20, or may be built on the SNS server 20. The database 25 stores data necessary to provide the social networking service. For instance, the database 15 stores data about users of the social networking service, and data about relations (friend relation or the like) between users built through the social networking service. Details thereof are described later (see FIG. 7).

The seat management system 1 and the SNS server 20 are capable of cooperating with each other. Specifically, if a user gives permission, user data in the social networking service is provided by the SNS server 20 to the seat management system 1. The SNS server 20 provides, for example, data about the relation (friend relation or the like) between the user and another user to the seat management system 1.

Examples of known technologies for accomplishing the cooperation between the seat management system 1 and the SNS server 20 described above include OAuth and similar technologies, and unique technologies provided by respective social networking service corporations. The cooperation described above is accomplished by utilizing these technologies.

In the description given here, the seat management system 1 obtains data about the relation (friend relation or the like) between a user and another user from the SNS server 20. Alternatively, the seat management system 1 may obtain this user relation data from another service than an SNS service. The seat management system 1 may generate the user relation data instead of obtaining the user relation data from another service. For instance, the seat management system 1 may generate data about fiend relation by receiving the friend registration from each user.

The seat management system 1 and the SNS server 20 can each perform data communication to/from a user terminal 3 via the communication network 2. The user terminal 3 is an information processing device used by a user. The user terminal 3 is, for example, a cellular phone, a portable information terminal, or a personal computer.

Procedures performed by a user of the ticket booking service are described. The premise of the description of the procedures is that the user is already using the social networking service and has built interpersonal relations (friend relation or the like) with other users through the social networking service.

The user first executes a user registration procedure. For example, the user accesses a web page that is provided by the seat management server 10 specifically for user registration, and registers his/her personal information.

The user also executes a procedure for permitting the SNS server 20 to provide user data to the seat management system 1. Once this procedure is complete, the seat management system 1 can obtain user data in the social networking service from the SNS server 20. For example, the seat management system 1 can obtain from the SNS server 20 data about the user's relation (friend relation or the like) with another user.

When the user wishes to purchase tickets, the user accesses the seat management server 10 from the user terminal 3, and selects a desired ticket. After a desired ticket is selected, a purchase screen for purchasing the ticket is displayed on a display unit of the user terminal 3.

Figure 3:
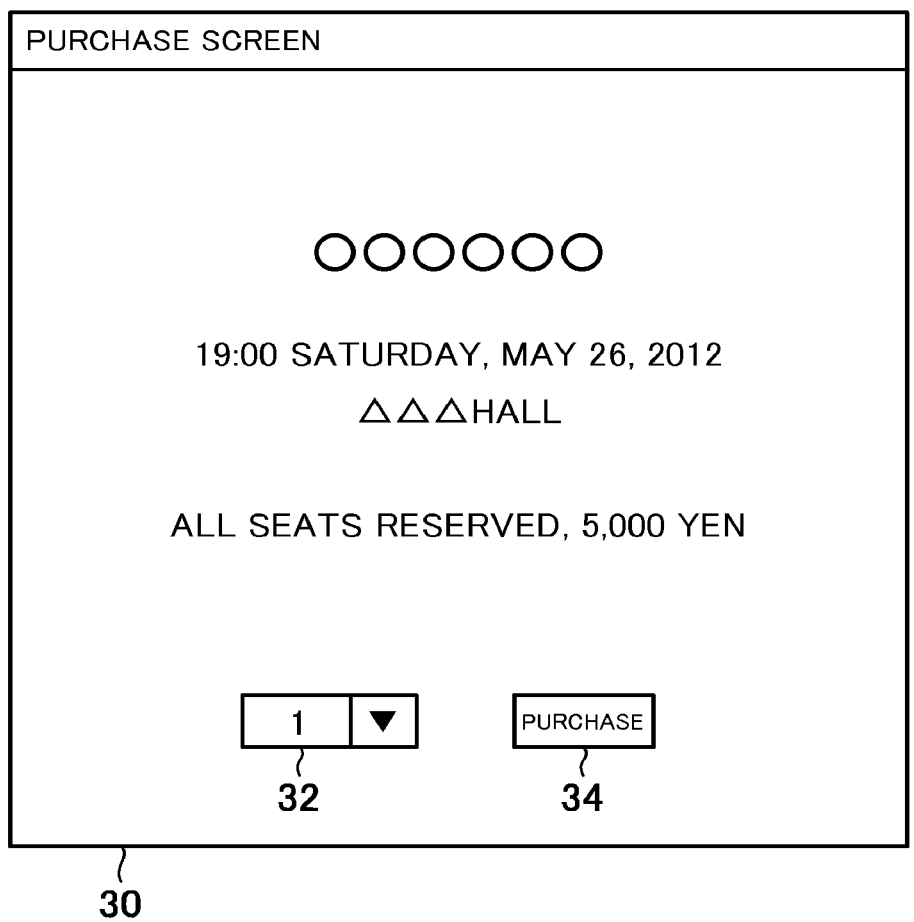
FIG. 3 is a diagram illustrating an example of a purchase screen.

FIG. 3 illustrates an example of the purchase screen. The purchase screen 30 displays information about the ticket that the user has selected. The purchase screen 30 also displays a number-of-tickets field 32 and a purchase button 34. The user specifies the number of tickets in the number-of-tickets field 32 and clicks on the purchase button 34. With a click of the purchase button 34, a seat specification screen for specifying a seat is displayed on the display unit of the user terminal 3.

Figure 4:
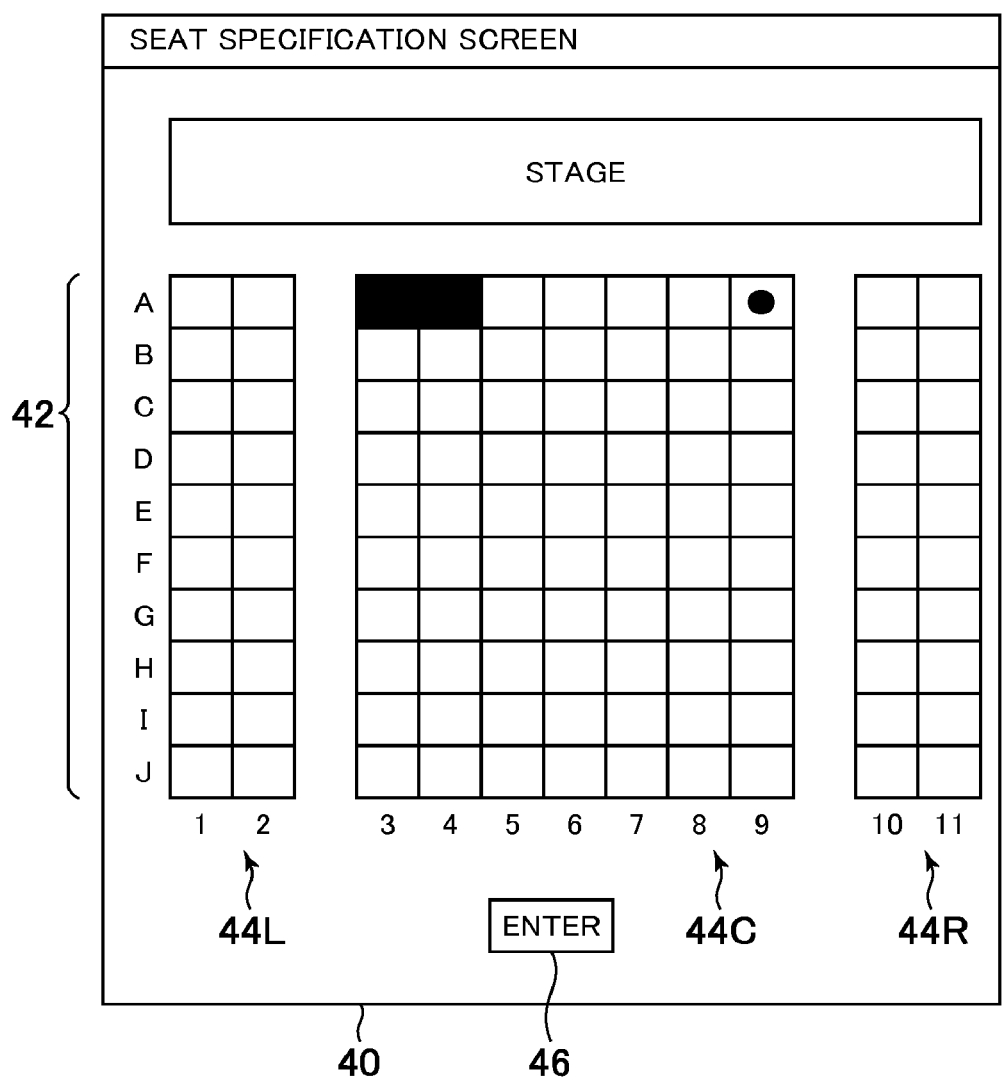
FIG. 4 is a diagram illustrating an example of a seat specification screen.

FIG. 4 illustrates an example of the seat specification screen. The seat specification screen 40 displays a seating chart 42 for showing the arrangement of seats at the event site. In the example of FIG. 4, seats are grouped in a plurality of blocks 44L, 44C, and 44R. Alphabet letters in the seating chart 42 indicate seat rows (horizontal lanes) and numbers in the seating chart 42 indicate seat columns (vertical lanes). Each seat is represented by a combination of an alphabet letter and a number. In the following description, a seat in Row A and Column 1, for example, is referred to as seat A1.

A seat painted black indicates a seat that has already been allocated to a user (reserved seat). The user selects a desired seat from among seats that have not been allocated to any users (vacant seats). In FIG. 4, a seat with a black circle indicates a seat specified by the user. After specifying a desired seat, the user clicks on an enter button 46.

When the enter button 46 is clicked, a confirmation screen (not shown) for final confirmation of the information about the event and seats is displayed and then the seat management server 10 is notified of a request for a seat reservation. In this case, for example, settlement processing, processing of allocating the seat to the user, and processing of issuing an electronic ticket to the user are executed. After such processing is finished, a completion screen is displayed on the display unit of the user terminal 3.

Figure 5:
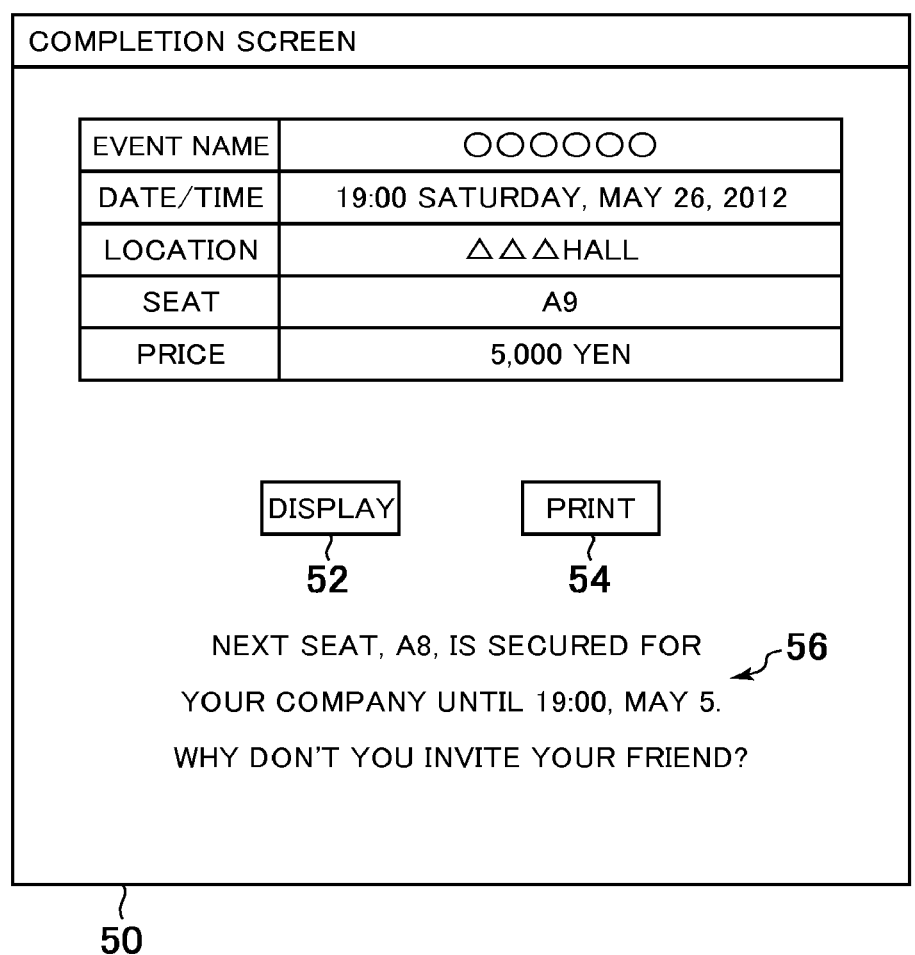
FIG. 5 is a diagram illustrating an example of a completion screen.

FIG. 5 illustrates an example of the completion screen 50. The completion screen 50 displays information about a ticket purchased by a user. The completion screen 50 also displays a display button 52 and a print button 54.

When the display button 52 is clicked, a code image which indicates the identification information of the ticket (ticket ID) is displayed on the display unit of the user terminal 3. The user terminal 3 functions as the ticket in this case. The user presents the code image displayed on the display unit of the user terminal 3 at the entrance to the event site on the day of the event. Whether or not the user is the person who has purchased the event's ticket is checked by reading the code image displayed on the display unit of the user terminal 3.

When the print button 54 is clicked, a printer that can communicate to/from the user terminal 3 prints out the code image indicating the identification information of the ticket (ticket ID). The paper on which the code image is printed functions as the ticket in this case. The user presents the code image printed on the paper at the entrance to the event site on the day of the event. Whether or not the user is the person who has purchased the event's ticket is checked by reading the code image printed on the paper.

The code image can also be displayed or printed on a purchase history screen (not shown) for showing the history of tickets purchased by the user.

The seat management system 1 temporarily secures, for the user's company, at least one seat that is adjacent to the seat reserved by the user. The completion screen 50 therefore displays a message 56 which informs that a seat A8 next to the seat A9 reserved by the user is temporarily secured as a seat for the user's company.

A friend of the user is given priority in purchasing a ticket for the seat secured as the seat for the user's company. Any user other than the user's friends, on the other hand, cannot purchase a ticket for the seat secured as the seat for the user's company. However, the seat for the user's company is secured only for a limited period, and no longer remains secured at the time the securement period of the seat secured for the user's company expires. The securement period is set based on the date/time of purchase of the ticket. For example, a date/time after a given length of time since the date/time of purchase of the ticket is set as the end date/time of the securement period.

To give an example, a user invites a friend to an event via the social networking service, e-mail, or the like. Deciding on accompanying the user to the event, the friend accesses the seat management server 10 to purchase a ticket of the event recommended by the user. The purchasing of this ticket, too, is executed via the purchase screen 30, the seat specification screen 40, and other screens that have been described.

Figure 6:
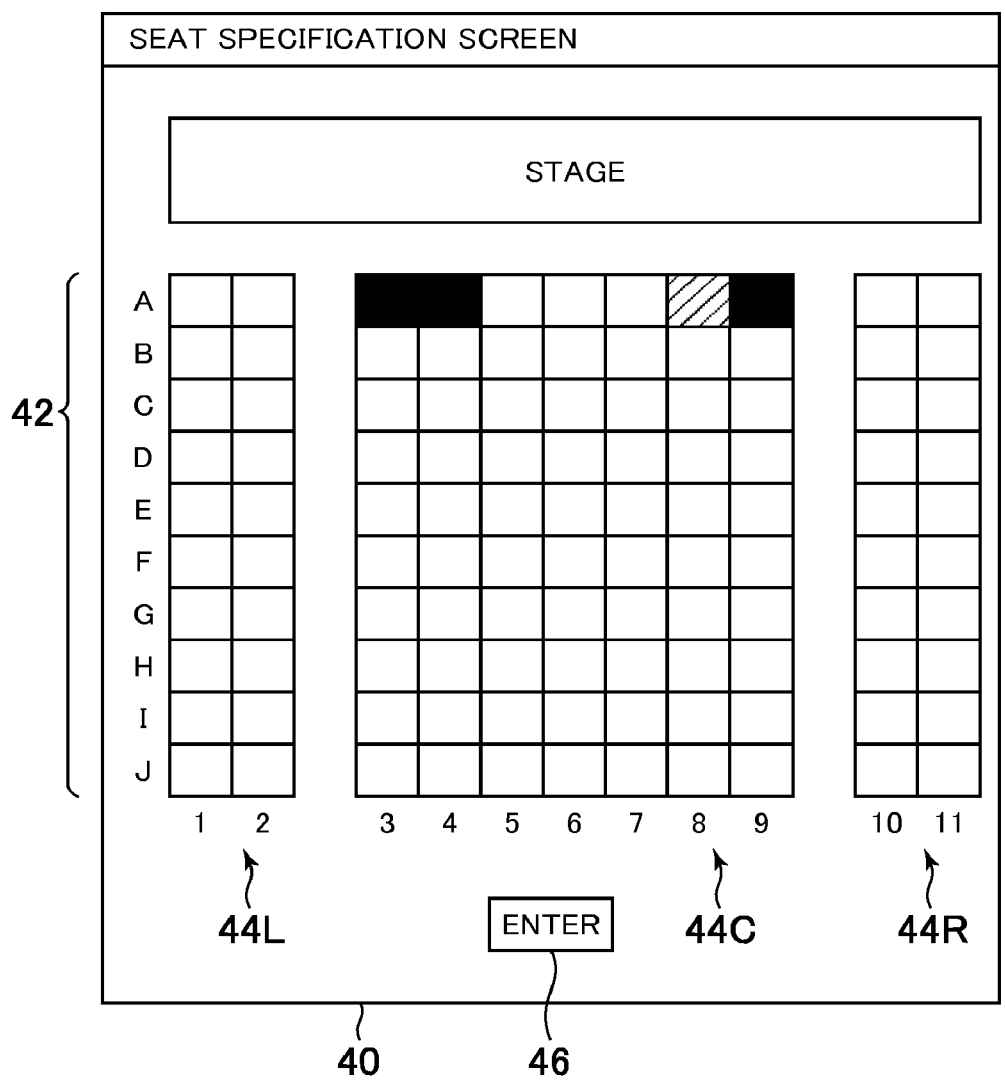
FIG. 6 is a diagram illustrating another example of the seat specification screen.

FIG. 6 illustrates an example of the seat specification screen 40 that is displayed in the case where a seat has been secured for the user's company. The seating chart 42 in this case displays seats so that seats already allocated to any user, the seat temporarily secured for the user's company, the vacant seats can be distinguished from one another. In FIG. 6, a hatched seat represents a seat temporarily secured for the user's company. The seat A8 is secured as a seat for company of the user of the seat A9 in the example of FIG. 6. In this case, only the friend of the user who has reserved the seat A9 can reserve the seat A8.

While one company's seat is secured for one reserved seat in the description given above, a plurality of company's seats may be secured for one reserved seat. The number of company's seats may be fixed to a given number, or may be changed from one event to another by the ticket booking agency or the promoter. Alternatively, the user may be allowed to select how many seats are to be secured for the user's company within a given upper limit.

The seat management system 1 described above enables a user to secure a seat for his/her own even when it is uncertain whether someone is going to accompany the user. The seat management system 1 also allows the user to secure seats adjacent to the user's seat as the seat for the user's company when it later becomes certain that someone is going to accompany the user.

The following describes the configuration for achieving the seat management system 1 described above. First, an example of data to be stored in the database 25 is described. FIG. 7 shows an example of data to be stored in the database 25.

FIG. 7 shows an example of a user table. The user table shows a list of users who use the social networking service. For example, the user table includes fields of "user ID", "password", "name". "e-mail address", and "friends". The user table includes at least one field other than these fields in actuality, but the at least one field is omitted here.

Information (user ID) for uniquely identifying a user who uses the social networking service is registered in the "user ID" field. A password specified by a user is registered in the "password" field. The user' name and e-mail address are registered in the "name" field and the "e-mail address" field, respectively.

A list of the user IDs of users who have a friend relation with the user is registered in the "friends" field. Instead of providing the "friends" field in the user table, a table showing a combination of users that have a friend relation may be stored in the database 25 separately from the user table.

An example of data to be stored in the database 15 is described. FIGS. 8 to 11 show an example of data to be stored in the database 15.

FIG. 8 shows an example of a user table. The user table shows a list of users who use the ticket booking service. For example, the user table includes fields of "user ID", "password", "name", "e-mail address", "credit card information", and "SMS user ID". The user table includes at least one field other than these fields in actuality, but the at least one field is omitted here.

Information (user ID) for uniquely identifying a user who uses the ticket booking service is registered in the "user ID" field. In the following description, a user who has a user ID "U1", for example, is referred to as user U1.

The user ID of a user in the ticket booking service may differ from, or may be the same as, the user ID of the user in the social networking service. In the description given here, the user ID of a user in the ticket booking service differs from the user ID of the user in the social networking service.

A password specified by line user is registered in the "password" field. The user's name and e-mail address are registered in the "name" field and the "e-mail address" field, respectively. Information about the user's credit card is registered in the "credit card information" field.

The user's user ID in the social networking service is registered in the "SNS user ID" field. For example, the user's user ID in the social networking service is registered in the "SNS user ID" field through cooperation between the seat management system 1 and the SNS server 20. Alternatively, the user's user ID in the social networking service is registered in the "SNS user ID" field by requesting the user to input the ID. In the case where the user uses the same user ID in the ticket booking service and the social networking service, the "SNS user ID" field may be omitted.

FIG. 9 shows an example of an event table. The event table shows a list of events whose tickets are sold through the ticket booking service. The event table includes fields of "event ID", "event name", "category", "date/time", "event site", and "price".

Information (event ID) for uniquely identifying an event is registered in the "event ID" field. The name and category of the event are registered in the "event name" field and the "category" field, respectively. The date/time on which the event is held and a site where the event is held are registered in the "date/time" field and the "event site" field, respectively. Information on the price of a ticket is registered in the "price" field.

FIG. 10 shows an example of a seat table. The seat table shows reservation statuses of respective seats in each event. The seat table includes fields of "event ID", "seat", "block", "status", "updated date/time", "reserved by", "ticket ID", and "associated seat".

The "event ID" field is identical to the "event ID" in the event table. Information (a seat ID) for uniquely identifying a seat is registered in the "seat" field. Information for uniquely identifying a block (a block ID) to which the seat belongs is registered in the "block" field. Values "L", "C", and "R" indicate the blocks 44L, 44C, and 44R, respectively.

Flag information that indicates the reservation status of the seat is registered in the "status" field. For example, a numerical value "0", "1", or "2" is registered in the "status" field. The numerical value "0" indicates that the seat is vacant. In other words, the numerical value "0" indicates that the seat is not allocated to any user. The numerical value "1" indicates that the seat has already been reserved. In other words, the numerical value "1" indicates that the seat has been allocated to a user. The numerical value "2" indicates that the seat is temporarily secured for a user's company.

When the reservation status of the respective seats is as illustrated in FIG. 6, for example, "1" is registered in the "status" field for the seats A3, A4, and A9, "2" is registered in the "status" field for the seat A8, and "0" is registered in the "status" field for the rest of the seats.

A date/time at which the value of the "status" field has been updated is registered in the "updated date/time" field. The user ID of a user who has been allocated the seat is registered in the "reserved by" field. A ticket ID for uniquely identifying an electronic ticket issued to the user is registered in the "ticket ID" field.

The "associated seat" field indicates the association between a seat allocated to a user and a seat temporarily secured for the user's company. For example, in the case where the seat A8 has been set as company's seat of the seat A9 allocated to a user, "A9" is registered in the "associated seat" field for the seat A8.

FIG. 11 shows an example of a history table. The history table shows the history of tickets purchased by a user. For example, the history table includes fields of "user ID", "event ID", "seat", "price", and "purchase date/time". A date/time at which a ticket has been purchased is registered in the "purchase date/time" field.

Figure 12:
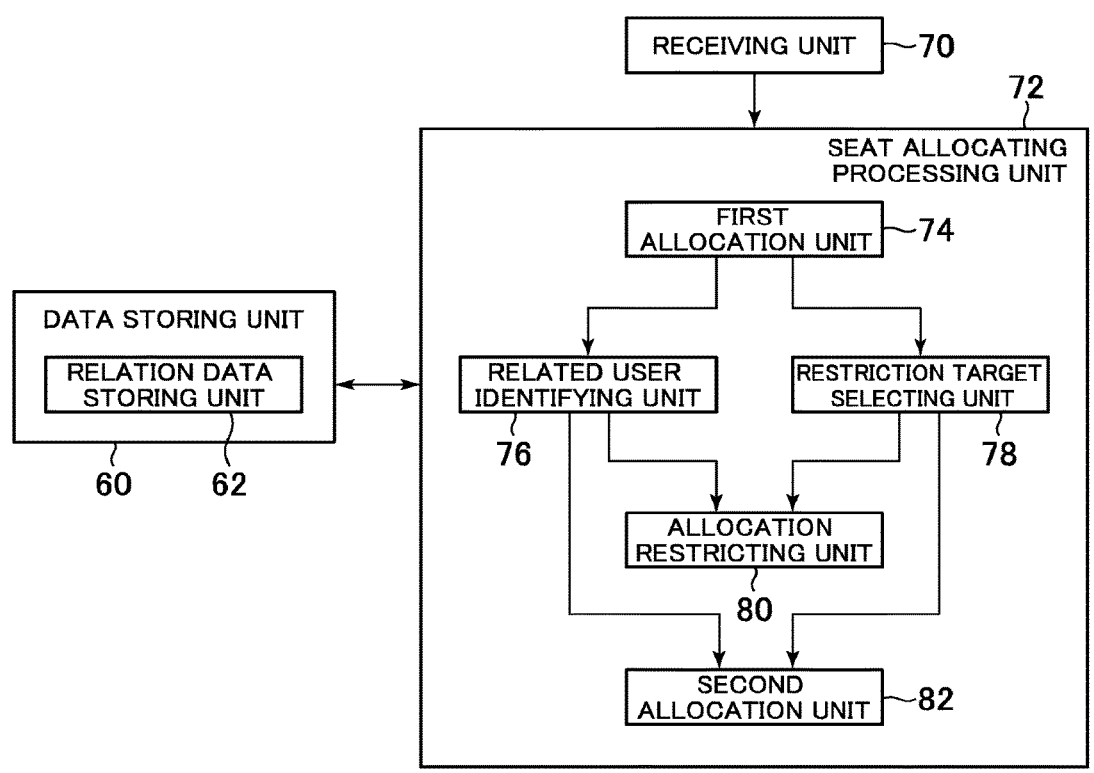
FIG. 12 is a function block diagram of the seat management system.

Function blocks implemented in the seat management system 1 are described. FIG. 12 is a function block diagram illustrating function blocks that are implemented in the seat management system 1. As illustrated in FIG. 12, the seat management system 1 includes a receiving unit 70 (receiving means) and a seat at locating processing unit 72. The receiving unit 70 and the seat allocating processing unit 72 are implemented by the control unit 11 of the seat management server 10.

A data storing unit 60 is also illustrated in FIG. 12. However, the data storing unit 60 is not always implemented in the seat management system 1, and may be implemented by a system outside the seat management system 1. For instance, the data storing unit 60 is implemented by the database 25. Alternatively, the data storing unit 60 is implemented by the databases 15 and 25, or may be implemented by the database 15 alone.

The data storing unit 60 stores data necessary for the seat allocating processing unit 72. The data storing unit 60 includes a relation data storing unit 62. The relation data storing unit 62 stores relation data which indicates a relation between users. For example, data which indicates a friend relation between users is stored in the relation data storing unit 62. The user table of FIG. 7, for example, is stored in the relation data storing unit 62.

The receiving unit 70 receives a request for a seat reservation from a user. The receiving unit 70 also receives the specification of a desired seat from a user.

The seat allocating processing unit 72 executes processing that relates to the allocation of a seat to a user. As illustrated in FIG. 12, the seat allocating processing unit 72 includes a first allocation unit 74 (first allocation means), a related user identifying unit 76 (related user identifying means), a restriction target selecting unit 78 (restriction target selecting means), an allocation restricting unit 80 (allocation restricting means), and a second allocation unit 82 (second allocation means).

The first allocation unit 74 allocates a seat to a user in a case where a request for a seat reservation is received from the user. In the case where the user U1 specifies the seat A3 as a desired seat, for example, the first allocation unit 74 allocates the seat A9 to the user U1. In the following description, a user assigned to a seat is referred to as "assigned user" for conveniences' sake.

The related user identifying unit 76 identifies a user who has a given relation to the assigned user, based on what is stored in the relation data storing unit 62. In the following description, a user who has a given relation to the assigned user is referred to as "related user" for conveniences' sake.

The "related user" is, for example, a user who has a friend relation with the assigned user. Specifically, the "related user" is a user who has built a friend relation with the assigned user through the social networking service. The "related user" can also be a user who has another given relation to the assigned user than a friend relation.

The restriction target selecting unit 78 selects, as a restriction target, "a seat or a group of seats that is adjacent to the seat allocated to the assigned user and that has not been allocated to any user", based on adjacent status data which indicates an adjacent status between seats, and allocation status data which indicates whether or not a seat is allocated to any user. In the example given above, as the adjacent status between seats can be grasped from the "seat" field and "block" field of the seat table, the "seat" field and "block" field of the seat table correspond to the "adjacent status data". As whether or not a seat is allocated to any user can be grasped from the "status" field, the "status" field of the seat table correspond to the "allocation status data". A seat or a group of seats that is selected as a restriction target corresponds to the "company's seat(s)" in the example given above. Accordingly, the restriction target selecting unit 78 corresponds to a component that selects at least one seat for the user's company.

A case where the seat A9 has been allocated to the user U1 (assigned user) is discussed. The restriction target selecting unit 78 in this case selects as the restriction target a seat that satisfies all of the following conditions (1) to (4).

(1) The seat is a vacant seat,
(2) The seat is adjacent to the seat A9.
(3) The seat is in the same row as the seat A9.
(4) The seat belongs to the same block as the seat A9.

In the situation of FIG. 4, for example, as the seat A8 satisfies all of the conditions (1) to (4) given above, the restriction target selecting unit 78 selects the seat A8 as the restriction target.

The restriction target selecting unit 78 may select as the restriction target a group of seats that satisfies all of the conditions (1) to (4). The "group of seats" as used herein means "a plurality of consecutive seats that belongs to the same block". In the situation of FIG. 4, for example, a group of seats consisting of A6, A7, and A8 satisfies all of the conditions (1) to (4). The restriction target selecting unit 78 therefore may select the group of seats consisting of A6, A7, and A8 as the restriction target.

The allocation restricting unit 80 restricts the allocation of a seat or a group of seats that is selected as the restriction target to any user other than the related user. For instance, the allocation restricting unit 80 prohibits a seat or a group or seats that is selected as the restriction target from being allocated to any user other than the related user. As described above, a seat or a group of seats that is selected as the restriction target corresponds to the "company's seat" in the example given above. The allocation restricting unit 80 accordingly corresponds to a component that restricts the allocation of a seat for a user's company to any people other than a friend of the user.

A case where the seat A9 has been allocated to the user U1 and the seat A8 has been selected as the restriction target is discussed. The allocation restricting unit 80 in this case restricts the allocation of the seat A8 to any user other than users who have a given relation (friend relation or the like) to the user U1.

The restriction imposed by the allocation restricting unit 80 lasts until a restriction period expires, and is lifted upon expiration of the restriction period. The "restriction period" is set based on, for example, a date/time at which the receiving unit 70 has received the request or the first allocation unit 74 has executed allocation.

To give an example, a date/time after a given length of time since the above described date/time is set as the end date/time of the restriction period. For instance, in the case where the above described date/time is "2012 May 2 19:00" and the given length of time is "3 days (i.e., 72 hours)", "2012/5/5 19:00" is set as the end date/time of the restriction period.

To give another example, 24:00 on a day past the given number of days since the above described date/time may be set as the end time of the restriction period. For instance, in the case where the above described date/time is "2012/5/2 19:00" and the given number of days is "3 days", "2012/5/5 24:00" may be set as the end date/time of the restriction period.

The second allocation unit 82 allocates to the related user the seat selected as the restriction target, or at least one of the group of seats selected as the restriction target, in a case where the request for a seat is received from the related user.

A case where the seat A9 has been allocated to the user U1 and the seat A8 has been selected as the restriction target is discussed. When a user who has a given relation (friend relation or the like) to the user U1 specifies the seat A8 as a desired seat in this situation, the second allocation unit 82 allocates the seat A3 to this user.

Figure 13:
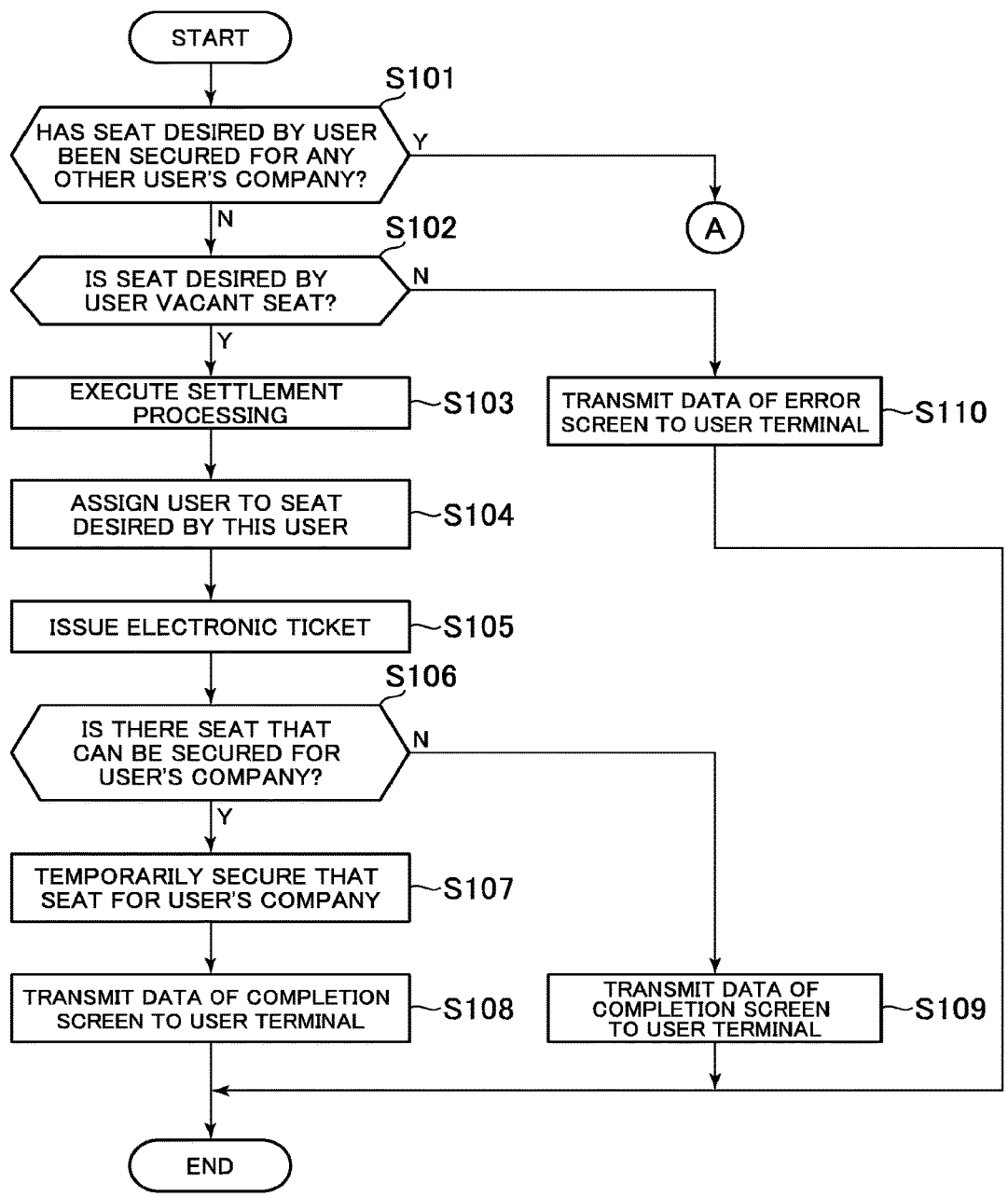
FIG. 13 is a diagram illustrating an example of processing that is executed in the seat management system.
Figure 14:
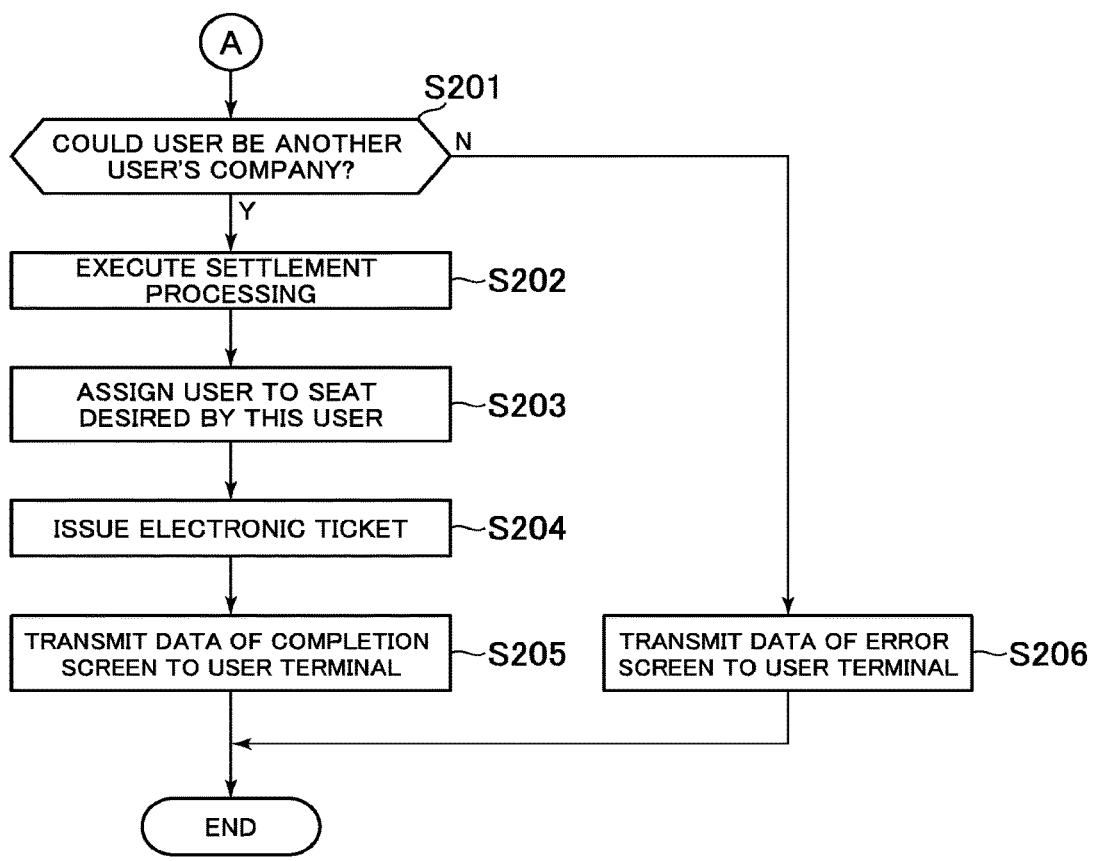
FIG. 14 is a diagram illustrating the example of the processing that is executed in the seat management system.

Processing that is executed in the seat management system 1 in order to implement the function blocks described above is described. FIGS. 13 and 14 illustrate an example of processing that is executed in the seat management server 10 in a case where a request for a seat reservation is received. The control unit 11 of the seat management server 10 executes the processing of FIGS. 13 and 14 according to a program, thereby functioning as line receiving unit 70 and the seat allocating processing unit 72.

FIGS. 15A to 15D are diagrams explaining the processing of FIGS. 13 and 14, and show an example of changes made to the seat table. The processing of FIGS. 13 and 14 is described below with reference to FIGS. 15A to 15D.

With a click of the enter button 46 of the seat specification screen 40, the confirmation screen on which the user checks information about the event and the seat for the last time is displayed and then the seat management server 10 is notified of the request for a seat reservation. The seat management server 10 in this case is notified of the user ID of the user, the event ID of the event selected by the user, the seat ID of the seat desired by the user, and the like.

When the request for a seat reservation is received by the seat management server 10, as illustrated in FIG. 13, the control unit 11 of the seat management server 10 determines whether or not the seat desired by the user has been secured for any user's company (S101). Specifically, the control unit 11 refers to the seat table to determine whether or not the value of the "status" field for the seat desired by the user is "2".

When it is determined that the seat desired by the user has not been secured for any user's company, the control unit 11 determines whether or not the seat desired by the user is a vacant seat (S102). Specifically, the control unit 11 refers to the seat table to determine whether or not the value of the "state" field for the seat desired by the user is "0".

When it is determined that the seat desired by the user is a vacant seat, the control unit 11 executes settlement processing (S103). The control unit 11 (the first allocation unit 74) assigns the user to the seat desired by the user (S104), and issues an electronic ticket to the user (S105).

A case where the user U1 has specified the seat A9 as a desired seat in the situation of FIG. 15A is discussed. As shown in FIG. 15B, the control unit 11 in this case updates the value of the "status" field for the seat A9 with "1" and registers the current date/time in the "updated date/time" field for the seat A9. The control unit 11 also registers "U1" in the "reserved by" field for the seat A9. The control unit 11 further generates a new ticket ID, taking care existing ticket IDs are not duplicated, and registers the generated ID in the "ticket ID" field for the seat A9.

After executing Steps S103 to S105, the control unit 11 (the restriction target selecting unit 78) determines whether or not there is a seat that can be secured for the user's company (S106). Specifically, the control unit 11 refers to the seat table to determine whether or not there is a seat that satisfies all of the conditions (1) to (4) given above.

When it is determined that there is a seat that can be secured as company's seat, the control unit 11 (the allocation restricting unit 80) temporarily secures that seat as company's seat (S107). In the case where there are a plurality of seats that can be secured for the user's company, one of the plurality of seats is secured as company's seat.

A case where the seat A8 is secured as company's seat of the seat A9 in the situation of FIG. 15B is discussed. As shown in FIG. 15C, the control unit 11 in this case updates the value of the "status" field for the seat A8 with "2" and registers the current date/time in the "updated date/time" field for the seat A8. The control unit 11 also registers "A9" in the "associated seat" field for the seat A8.

After executing Step S107, the control unit 11 transmits data of the completion screen 50 to the user terminal 3 (S108). The display unit of the user terminal 3 in this case displays the completion screen 50 as the one illustrated in FIG. 5, for example.

In the case where it is determined in Step S106 that there is no seat that can be secured for the user's company, the control unit 11 transmits data of the completion screen 50 to the user terminal 3 (S109). However, the message 56 is not displayed in the completion screen 50 in this case because no seat is secured as company's seat.

In the case where it is determined in Step S102 that the seat desired by the user is not a vacant seat, the control unit 11 transmits data of an error screen to the user terminal 3 (S110). A message informing that the seat desired by the user has already been reserved for another user is displayed in the error screen.

In the case where it is determined in Step S101 that the seat desired by the user has been secured for some user's company, as illustrated in FIG. 14, the control unit 11 (the related user identifying unit 76) determines whether or not the user requesting for a reservation could be company of that user (S201).

For example, processing described below is executed in Step S201. Discussed here is a case where the user U2 has specified as a desired seat the seat A8, which has been secured as company's seat. In the situation of FIG. 15C.

The control unit 11 of the seat management server 10 first refers to the seat table to find out that the seat A8 is set as company's seat of the seat A9. The control unit 11 also finds out that the user U1 is assigned to the seat A9.

The control unit 11 in this case determines whether or not the user U2 has a friend relation with the user U1. The control unit 11 first obtains a friends list of the user U2 from the SNS server 20. For example, the control unit 11 obtains an SNS user ID "SU2" of the user U2 from the user table (FIG. 8), and transmits the SNS user ID "SU2" to the SNS server 20.

The control unit of the SNS server 20 refers to the user table (FIG. 7) to obtain a friend list "SU1, SU5" associated with the SNS user ID "SU2", and returns the friend list "SU1, SU5" to the seat management server 10.

Then the control unit 11 of the seat management server 10 obtains an SNS user ID "SU1" of the user U1 from the user table (FIG. 8). The control unit 11 determines whether or not "SU1" is included in the friend list "SU1, SU5" obtained from the SNS server 20. When "SU1" is included in the friend list "SU1, SU5", the control unit 11 determines that the user U2 is a friend of the user U1. The control unit 11 in this case determines that the user U2 could be company of the user U1.

While a friend list of the user U2 is obtained from the SNS server 20 to determine whether or not the user U1 is on the friend list of the user U2 in the description given above, a friend list of the user U1 may be obtained from the SNS server 20 to determine whether or not the user U2 is on the friend list of the user U1.

Processing executed in Step S201 is not limited to the one described above. In Step S201, the following processing may be executed. A case where the user U2 has specified as a desired seat the seat A8, which has been secured as company's seat, in the situation of FIG. 15C is discussed here, too.

The control unit 11 of the seat management server 10 first obtains the SNS user ID "SU2" of the user U2 from the user table (FIG. 8). The control unit 11 refers to the seat table to find out that the seat A8 is set as company's seat of the seat A9. The control unit 11 also finds out that the user U1 is assigned to the seat A3. The control unit 11 then obtains the SNS user ID "SU1" of the user U1 from the user table (FIG. 8).

Thereafter, the control unit 11 transmits "SU1, SU2" which is a combination of the SNS user IDs of the user U1 and the user U2 to the SNS server 20, thereby making an inquiry to the SNS server 20 about whether or not there is a friend relation between the user U1 and the user U2.

The control unit of the SNS server 20 refers to the user table (FIG. 7) to determine whether or not there is a friend relation between the user SU1 and the user SU2, and returns the result of the determination to the seat management server 10.

In the case where the determination result returned from the SNS server 20 indicates that there is a friend relation between the user U1 and the user U2, the control unit 11 of the seat management server 10 determines that the user U2 could be company of the user U1. In the case where the determination result returned from the SNS server 20 indicates that there is no friend relation between the user U1 and the user U2, on the other hand, the control unit 11 determines that the user U2 could not be company of the user U1.

In the case where it is determined in Step S201 that the user requesting for a reservation could be the other user's company, the control unit 11 executes settlement processing (S202). The control unit 11 (the second allocation unit 82) assigns the user to the seat desired by the user (S203), and issues an electronic ticket to the user (S204).

For example, a case where it is determined in Step S201 that the user U2 who has specified the seat A8 as a desired seat could be the other user's company in the situation of FIG. 15C is discussed. As shown in FIG. 15D, the control unit 11 in this case updates the value of the "status" field for the seat A8 with "1" and registers the current date/time in the "updated date/time" field for the seat A8. The control unit 11 also registers "U2" in the "reserved by" field for the seat A8. The control unit 11 further generates a new ticket ID, taking cars existing ticket IDs are not duplicated, and registers the generated ID in the "ticket ID" field for the seat A8.

After executing Steps S202 to S204, the control unit 11 transmits data of the completion screen 50 to the user terminal 3 (S205). However, the message 56 is not displayed in the completion screen 50 in this case because no new company's seat is secured.

In the case where it is determined in Step S201 that the user requesting for a reservation could not be the other user's company, the control unit 11 transmits data of an error screen to the user terminal 3 (S206). This error screen displays a message informing that the seat desired by the user has been reserved for the company of another user who does not have a friend relation with the user, and therefore cannot be reserved.

Though omitted from FIGS. 13 and 14, the control unit 11 monitors whether or not the securement period has expired, for each seat secured as company's seat. Whether the securement period has expired or not is determined based on an updated date/time registered in the "updated date/time" field for each seat. For example, in the case where a date/time after a given length of time since the updated date/time is set as the end time of the securement period, the control unit 11 determines whether or not the securement period has expired by determining whether or not the given length of time has elapsed since the updated date/time.

When the securement period of company's seat expires, the control unit 11 returns the seat secured as company's seat to the "vacant seat" status. For example, the control unit 11 updates the value of the "status" field for that seat with "0" and registers the current date/time in the "updated date/time" field for that seat. The control unit 11 also clears the "associated seat" field for the seat.

The seat management system 1 described above enables a user to secure a seat for his/her own even when it is uncertain whether someone is going to accompany the user.

The seat management system 1 also allows the user to secure a seat adjacent to the user's seat as company's seat when it later becomes certain that someone is going to accompany the user.

The seat management system 1 obtains data about the relation (friend relation or the like) between users from an existing social networking service. The seat management system 1 is thus free from the trouble of newly registering data about the relation (friend relation or the like) between users.

In addition, the seat management system 1, where a user (who invites someone to go with him/her) can choose a seat at his/her discretion, guarantees users the freedom of choice in seat selection.

The present invention is not limited to the above-mentioned embodiment.

Modification Example 1

For instance, the seat specification screen 40 may be designed so that a seat secured for a user's company cannot be specified by other users than friends of the user. In the situation of FIG. 10, for example, the seat A8 is secured for someone to go with the user U1. The seat specification screen 40 in this case may be designed so that the seat A8 cannot be specified by other users than friends of the user U1.

Modification Example 2

To give another example, a completion screen 50A illustrated in FIG. 16 may be displayed instead of the completion screen 50 of FIG. 5. The completion screen 50A of FIG. 16 differs from the completion screen 50 of FIG. 5 in that an invitee candidate list 30 and an invite button 92 are included.

Friends of the user are displayed as the invitee candidate list 90. The user specifies an invitee from among friends displayed on the invitee candidate list 90 and clicks on the invite button 92. With the click of the invite button 92, an invitation message is sent via the social networking service, e-mail, or the like to the friend specified as the invitee.

Processing for displaying the completion screen 50A described above is described. In Modification Example 2, processing described below is executed in Step S108 of FIG. 13.

The control unit 11 (invitee candidate selecting means) of the seat management server 10 first obtains a friend list of the user from the SNS server 20 as a list of invitee candidates. This is the same processing as Step S201 of FIG. 14.

Thereafter, the control unit 11 refers to the user table (FIG. 8) to obtain the names of users who are on the friend list. Based on the thus obtained names, the control unit 11 (invitee candidate presenting means) generates data of the completion screen 50A which includes the invitee candidate list 90, and transmits the data to the user terminal 3. As a result, the completion screen 50A such as the one illustrated in FIG. 16 is displayed on the display unit of the user terminal 3, thereby presenting the invitee candidate list 90 to the user.

When the invite button 92 of the completion screen 50A is clicked, for example, the user ID of the inviter user, the event ID of the event, and the user ID of the friend specified as the invitee are transmitted to the seat management server 10.

Then the control unit 11 of the seat management server 10 refers to the user table (FIG. 8) to obtain an e-mail address of the friend specified as the invitee. Based on the obtained e-mail address, the control unit 11 (inviting means) sends e-mail indicating an invitation message to the friend specified as the invitee.

Alternatively, the control unit 11 refers to the user table (FIG. 8) to obtain the SNS user ID of the friend specified as the invitee. The control unit 11 (the inviting means) transmits the obtained SNS user ID and the contents of an invitation message to the SNS server 20, thereby requesting the SNS server 20 to notify the friend specified as the invitee of the invitation message. The SNS server 20 in this case notifies the friend specified as the invitee of the invitation message according to the request from the seat management server 10.

According to Modification Example 2 described above, the seat management system 1 can assist a user by facilitating the inviting of a desired friend to go with the user.

The selection of invitee candidates in Modification Example 2 may be executed based on the history table (history data) stored in the database 15 (history data storing means).

For instance, friends who have purchased in the past tickets for events in a category the same as or similar to that of the event in question may be selected as the invitee candidates from among the user's friends. In this case, whether or not events have the same category or categories similar to each other can be determined based on data that defines combinations of the same or similar categories.

In this way, the seat management system 1 can assist a user by facilitating the inviting of a friend who is likely to go with the user to an event.

The seat management system 1 in Modification Example 2 may be designed so that only the friend who is specified as the invitee is allocated company's seat. In other words, the friend of the user who is not specified as the invitee may be restricted from being allocated company's seat. In this way, company's seat is allocated only to the friend who is specified by the user as the invitee.

Modification Example 3

While an invitation message is transmitted to a friend specified by the user as the invitee in Modification Example 2, a friend of the user may be selected as the invitee without requiring the user to specify the invitee, and the friend of the user selected as the invitee may be notified of an invitation message.

In Modification Example 3, processing described below is executed before or after Step S108 of FIG. 13, for example.

The control unit 11 (the invitee candidate selecting means) of the seat management server 10 first obtains a friend list of the user from the SNS server 20 as a list of invitees. This is the same processing as Step S201 of FIG. 14.

Thereafter, the control unit 11 (the inviting means) refers to the user table (FIG. 8) to obtain the names and e-mail addresses of users who are on the friend list, and sends e-mail indicating an invitation message to the users as the invitees.

Alternatively, the control unit 11 refers to the user table (FIG. 8) to obtain the SNS user ID of the user. The control unit 11 (the inviting means) transmits the obtained SNS user ID and the contents of an invitation message to the SNS server 20, thereby requesting the SNS server 20 to notify the user's friends of the invitation message. The SNS server 20 in this case notifies the user's friend (invitee users) of the invitation message according to the request from the seat management server 10.

According to Modification Example 3 described above, the seat management system 1 can assist a user by facilitating the inviting of the user's friend to go with the user.

The selection of invitees in Modification Example 3 may be executed based on the history table (history data) stored in the database 15 (the history data storing means).

For instance, friends who have purchased in the past tickets for events in the category the same as or similar to that of the event in question may be selected as the invitees from among the user's friends. In this case, whether or not events have the same category or categories similar to each other can be determined based on the data that defines the combinations of the same or similar categories.

In this way, the seat management system 1 can assist a user by facilitating the inviting of a friend who is likely to go with the user to an event as user's company.

Modification Example 4

Figure 17:
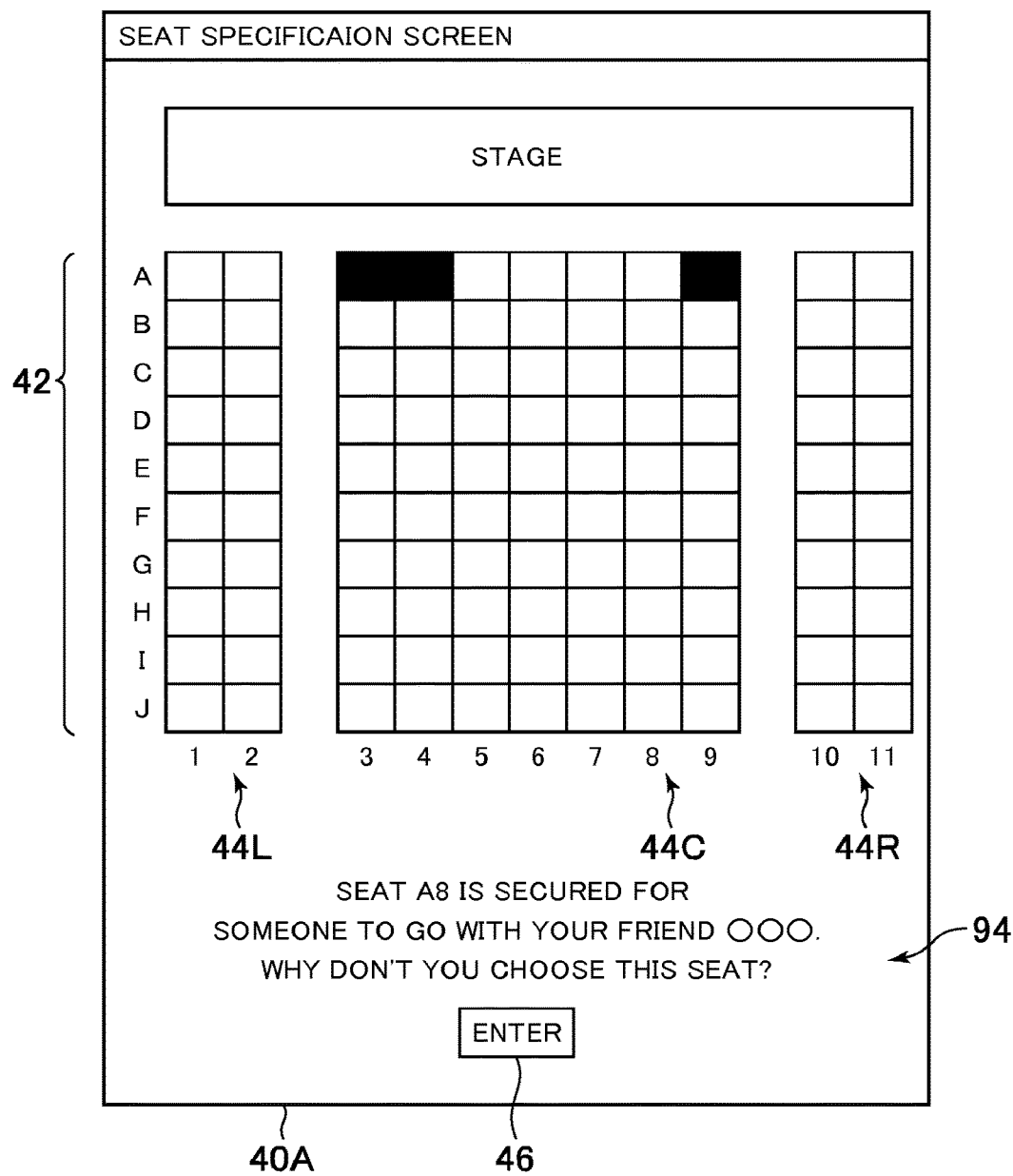
FIG. 17 is a diagram illustrating still another example of the seat specification screen.

To give still another example, a seat specification screen 40A illustrated in FIG. 17 may be displayed instead of the seat specification screen 40 of FIG. 6. FIG. 17 illustrates an example of the seat specification screen 40 that is displayed on the display unit of the user terminal 3 of the user U2, who is a friend of the user U1, in the case where the seat A8 has been secured for someone who is going to accompany the user U1 (see FIG. 10).

The seat specification screen 40A of FIG. 17 differs from the seat specification screen 40 of FIG. 6 in that a message 94 is included. The message 34 informs that the seat A8 is secured for someone who is going to accompany the user U1. The user U2 who is a friend of the user U1 can understand at a glance that the seat A8 is secured for someone who is going to accompany the user U1 by viewing the message 94.

Instead of displaying the message 94, the seat A8 may be displayed in a manner that distinguishes or highlights the seat A8. Alternatively, a given image may be displayed in association with the seat A8. The seat management system 1 may ensure that the user U2 who is a friend of the user U1 can understand at a glance that the seat A8 is secured for someone who is going to accompany the user U1 in this manner.

According to Modification Example 4, the seat management system 1 can assist a user by making it easy for the user to know which seat is secured for someone who is going to accompany the user's friend.

Modification Example 5

In the situation of FIG. 10, for example, the seat A8 is secured for someone who is going to accompany the user U1. Processing described below may be executed in the case where a user U3 who is not friends with the user U1 specifies the seat A8 as a desired seat in the situation of FIG. 10.

For example, the control unit 11 of the seat management server 10 inquires the user U1 about whether the user U1 wishes to reserve the seat A8 secured as his/her company's seat. This inquiry is made via the social networking service, e-mail, or the like. A response to the inquiry is received on a given Web page which is provided by the seat management server 10.

In the case where the user U1 chooses to reserve the seat A8, the control unit 11 allocates the seat A8 to the user U1. The same processing as Steps S202 to S205 of FIG. 14 is executed in this case.

In the case where the user U1 does not choose to reserve the seat A8, on the other hand, the control unit 11 allocates the seat A8 to the user U3. The same processing as Steps S202 to S205 of FIG. 14 is executed in this case, too.

In this way, a chance to reserve a seat secured for a user's company can be given also to users who are not friends with the user.

Modification Example 6

In the situation of FIG. 10, for example, the seat A8 is secured for someone who is going to accompany the user U1. The seat A8 is freed up and returns to the "vacant seat" status as described above in the case where the company's seat securement period expires without the seat A8 being specified by a friend of the user U1 (i.e., without the user's company being decided) in the situation of FIG. 10.

In this case, the allocation of the seat A3 to the user U1 may be canceled in response to a request (the declaration of will) from the user U1. In short, the seat A9 allocated to the user U1 may be freed up.

The request (the declaration of will) of the user U1 may be received after the company's seat securement period expires, or may be received in advance, before the expiration of the company's seat securement period. For example, a request (the declaration of will) to cancel the seat A9 if the user U1 is unsuccessful at finding someone who can definitely go with the user U1 may be received in advance from the user U1 at the time a reservation for the seat is made (at the time the ticket is purchased).

Modification Example 7

In the situation of FIG. 10, for example, the seat A8 is secured for someone who is going to accompany the user U1. The seat management system 1 may be configured so that, in the case where another user requests to make a reservation for the seat A8 secured as a company's seat after the securement period of this company's seat expires, the user U1 who has originally made a reservation is suggested to change his/her seat to one of a plurality of adjacent vacant seats. For example, in the situation of FIG. 10 where adjacent seats A1 and A2 are vacant seats, the user U1 may be suggested to switch to one of the seats A1 and A2. In the case where the user U1 changes his/her seat to the seat A2, for example, the seat A1 adjacent to the seat A2 is not secured for someone to go with the user U1 but a chance of reserving a seat adjacent to the seat of the user U1 is left to a person who accompanies the user U1.

In this way, a user who does not care about the exact seat location is provided with an effect similar to securing a seat for the user's company, even when the number of remaining days is small, and users can therefore enjoy an even greater convenience. This is beneficial to event promoters as well in that the likelihood of reducing vacant seats rises without depriving other users of a chance to make a reservation when the date of event draws closer, i.e., without disadvantaging other users.

Modification Example 8

To give yet still another example, the length of the company's seat securement period (restriction period) may be varied based on the number of seats that are not allocated to any user.

For instance, a shorter company's seat securement period may be set when the number of seats that are not allocated to any user is lower. In other words, a longer company's seat securement period may be set when the number of seats that are not allocated to any user is higher.

The "number of seats that are not allocated to any user" may be the number of seats for which the value of the "status" field is "0", or may be the number of seats for which the value of the "status" field is not "1".

In the case of varying the length of the company's seat securement period based on the number of seats that are not allocated to any user, association relation information that indicates an association relation between the number of seats and the length of the securement period is necessary, and the length of the company's seat securement period is set based on this information and the number of seats that are not allocated to any user.

As discussed above, one objective of the present system is to allow a temporary reservation for a seat before a group is determined. However, during a period for this temporary reservation (e.g., a restriction period), a reservation for a temporarily reserved seat by someone other than those who made the temporary reservation is restricted. When the restriction period is fixed, a technical problem arises when the system is flooded by users accessing the system for seat reservations (e.g., the situation where the quantity of available seats is small, but an event is popular). Until reservations for the temporarily reserved seats are confirmed, a large number of "meaningless" user accesses can occur (e.g., applications for reservations from someone other than those who made the temporary reservations, which increases web traffic, increases system load, and reduces efficiency of the system). By varying the length of the restriction period based on the number of remaining seats (e.g., setting the restriction period to be short when the number of remaining seats is small) the number of meaningless accesses can be reduced, thereby reducing web traffic, reducing system load, and increasing efficiency of the system. On the other hand, in a situation where an access for a seat reservation seldom occurs (e.g., when the quantity of remaining seats is large), the restriction period for the temporary reservations can be set to a longer period of time. As noted above, while making it possible to confirm reservations for more seats, the accesses for confirming the reservations for those seats can also be reduced, thereby reducing web traffic, reducing system load, and increasing efficiency of the system.

This system improves conventional seat reservation systems and makes them more dynamic and efficient by reducing web traffic and system loads (specific to the realm of Internet technology.)

Modification Example 9

To give yet still another example, the length of the company's seat securement period (restriction period) may be varied based on the number of remaining days or the remaining time till an event in question is held.

For example, a shorter company's seat securement period may be set when the number of remaining days or the remaining time is small. In other words, a longer company's seat securement period may be set when the number of remaining days or the remaining time is large.

For instance, the securement period may normally be set to three days and changed to one day when the number of remaining days till the event is held is seven days or less.

In the case of varying the length of the company's seat securement period based on the number of remaining days or the remaining time till an event in question is held, association relation information that indicates an association relation between the number of remaining days or the remaining time and the length of the securement period is necessary, and the length of the company's seat securement period is set based on this information and the number of remaining days or the remaining time till the event is held.

Modification Example 10

While the embodiment described above allows a user to specify a desired seat, the present invention does not necessarily involve allowing a user to specify a desired seat. The seat management system 1 may be designed so that a user cannot specify a desired seat. In other words, the seat management server 10 may select a seat to be allocated to a user.

Two or more of Modification Examples 1 to 10 may be used in combination.

DESCRIPTION OF REFERENCE NUMERAL 1 seat management system, 2 communication network, 3 user terminal, 10 seat management server, 11 control unit, 12 storage unit, 13 optical disk drive unit, 14 communication unit, 15, 25 database, 20 SNS server, 30 purchase screen, 32 number-of-tickets field, 34 purchase button, 40, 40A seat specification screen, 42 seating chart, 44L, 44C, 44R block, 46 enter button, 50, 50A completion screen, 52 display button, 54 print button, 58, 94 message, 60 data storing unit, 62 relation data storing unit, 70 receiving unit, 72 seat allocating processing unit, 74 first allocation unit, 76 related user identifying unit, 78 restriction target selecting unit, 80 allocation restricting unit, 82 second allocation unit, 90 invitee candidate list, 92 invite button.

The invention claimed is:
1. A seat management system for managing seats at an event site, comprising:
at least one processor; and
at least one memory device that stores a plurality of instructions, which when executed by the at least one processor, cause the at least one processor to:
be configured to receive a request at the processor of the seat management system for a seat reservation from a user, said request being sent over a communication network;
allocate one seat to the user as a seat for the user based on the requested seat reservation from the user;
identify a related user who has a given relation to an assigned user to whom the one seat has been allocated, based on what is stored in a storage which stores relation data indicating a relation between users;
select, as a restriction target, one of a seat and a group of seats that is adjacent to the one seat allocated to the assigned user and that has not been allocated to any user, based on adjacent status data which indicates an adjacent status between seats, and allocation status data which indicates whether or not a seat is allocated to any user;
restrict allocation of the one of the seat and the group of seats that has been selected as the restriction target to any user other than the related user for a given restriction period, wherein the processor starts the restriction after the one seat is allocated to the assigned user as the seat for the assigned user but the processor does not carry out the restriction before the one seat is allocated to the assigned user as the seat for the assigned user;

allocate one of the seat selected as the restriction target and at least one seat out of the group of seats selected as the restriction target to the related user in a case where a request is received from the related user for another seat reservation, and vary, by the processor, a length of the given restriction period based on a number of seats that are not allocated to any user.

2. The seat management system of claim 1, wherein the length of the given restriction period is increased if the number of seats that are not allocated to any user is increased and the length of the given restriction period is decreased if the number of seats that are not allocated to any user is decreased.

3. A control method for a seat management system for managing seats at an event site, the control method comprising:

receiving a request at a processor for a seat reservation from a user, the request being sent over a communication network;

allocating one seat to the user as a seat for the user based on the requested seat reservation from the user;

identifying a related user who has a given relation to an assigned user to whom the least one seat has been allocated, based on what is stored in a storage which stores relation data indicating a relation between users;

selecting, as a restriction target, one of a seat and a group of seats that is adjacent to the one seat allocated to the assigned user and that has not been allocated to any user, based on adjacent status data which indicates an adjacent status between seats, and allocation status data which indicates whether or not a seat is allocated to any user;

restricting allocation of the one of the seat and the group of seats that has been selected as the restriction target to any user other than the related user for a given restriction period, wherein the restriction starts after the one seat is allocated to the assigned user as a seat for the assigned user but the restriction is not carried out before the one seat is allocated to the assigned user as the seat for the assigned user;

allocating one of the seat selected as the restriction target and at least one seat out of the group of seats selected as the restriction target to the related user in a case where a request is received from the related user for another seat reservation; and varying, by the processor, a length of the given restriction period based on a number of seats that are not allocated to any user.

* * * * *